United States Patent [19]
Forstbauer

[11] 3,876,922
[45] Apr. 8, 1975

[54] TRANSIENT RESPONSIVE COMPENSATION CIRCUIT FOR AN INVERTER ARRANGEMENT

[75] Inventor: Wilhelm Forstbauer, Erlangen, Germany

[73] Assignee: Siemens Aktiengesellschaft, Munich, Germany

[22] Filed: Nov. 21, 1973

[21] Appl. No.: 417,892

[30] Foreign Application Priority Data
Nov. 22, 1972 Germany............................ 2257264

[52] U.S. Cl. ....................... 321/11; 307/66; 317/50; 321/20; 321/27 MS
[51] Int. Cl. ............................................. H02p 13/00
[58] Field of Search ....... 321/11, 14, 19, 20, 27 MS, 321/45 C, DIG. 1; 317/50; 307/64, 66; 322/86

[56] References Cited
UNITED STATES PATENTS

| | | | |
|---|---|---|---|
| 3,379,955 | 4/1968 | Koetsch | 321/45 C |
| 3,605,003 | 9/1971 | Guggi | 321/20 |
| 3,609,386 | 9/1971 | Patlach | 307/66 |
| 3,644,819 | 2/1972 | Jackson | 321/20 |
| 3,646,355 | 2/1972 | Ireland et al. | 307/64 |
| 3,671,846 | 6/1972 | Corey | 321/27 MS |
| 3,818,317 | 6/1974 | Isono et al. | 317/50 |

FOREIGN PATENTS OR APPLICATIONS

| | | | |
|---|---|---|---|
| 17,757 | 9/1963 | Japan | 321/14 |
| 288 | 1/1971 | Japan | 321/20 |
| 262,233 | 6/1970 | U.S.S.R. | 321/11 |

*Primary Examiner*—William H. Beha, Jr.
*Attorney, Agent, or Firm*—Kenyon & Kenyon Reilly Carr & Chapin

[57] ABSTRACT

A circuit for use in an inverter arrangement of the type which feeds a load through at least one filter having an essentially constant a-c output voltage. The present circuit is arranged so that the d-c input to the inverter is shunted by a series circuit comprising a switch and a storage capacitor and includes an auxiliary d-c source for charging the storage capacitor to a voltage higher than the d-c input voltage of the inverter so that closing the switch will impress on the inverter input a d-c voltage of the same polarity but at a higher level enabling the circuit to compensate for transient reactances caused in the filter due to load surges. In the preferred embodiment, a d-c control circuit is used as the switch.

12 Claims, 4 Drawing Figures

3,876,922

TRANSIENT RESPONSIVE COMPENSATION CIRCUIT FOR AN INVERTER ARRANGEMENT

BACKGROUND OF THE INVENTION

This invention relates to a circuit for an inverter arrangement in general, and more particularly to such a circuit which may be used to compensate for transient reactances in the inverter filter caused by load surges.

Typically, the output voltage of an inverter is not connected directly to the load but is first passed through filters which are tuned to the fundamental frequency and suppress higher harmonics. For example, an inverter arrangement is known which comprises two three-phase inverters and a transformer circuit. The inputs of the two inverters are fed from a common d-c voltage source and their outputs combined in the transformer to form an overall output voltage. In the control unit of this inverter arrangement, a single periodic synchronizing signal is present. The control signals for the main semiconductors of the one inverter are advanced in time by an adjustable control angle relative to the synchronizing signal. The control signals for the main semiconductors of the other inverter, however, are retarded by the same control angle relative to the synchronizing signal. This permits obtaining two output voltages shifted in phase which are then combined in the transformer to form the overall output voltage. This arrangement can be provided with a voltage control circuit which will maintain a constant overall output voltage. By shifting the control angle simultaneously in different directions through the use of the voltage control circuit, the overall output voltage is held constant despite changes in magnitude of the input voltage. Since the overall output voltage has a quite high harmonic content, it is then filtered through the use of band-pass filters before being provided to the load. In such systems, the distortion of the a-c output voltage after passing through the band-pass filter, should not be more than 5 percent.

If load surges occur, the filters preceding the load acquire a transient reactance, depending on their magnitude, in inverter arrangements of the disclosed type. In other words, a series inductance, across which a considerable voltage drop occurs, becomes temporarily effective in the filter during a load surge. The fundamental of the a-c output voltage across the load is thereby reduced. Dips such as these in the a-c voltage can also occur in the inverter arrangement of the above referenced type, despite the voltage control circuit, since the voltage adjustment by the voltage control is generally not fast enough.

In almost all cases, voltage dips of this nature are not desirable. Thus, it can be seen that there is a need to provide a circuit which is capable of compensating for dips of short duration in the a-c output voltage which is feeding the load, which dips are caused by the transient reactance of the filter when load surges occur.

SUMMARY OF THE INVENTION

The present invention solves this problem by providing a series circuit across the d-c input to the inverter, which series circuit includes a switch and storage capacitor. Means are provided to charge the storage capacitor to a voltage which is higher than the normal input d-c voltage of the inverter arrangement, which voltage will then be present at the same polarity as the normal voltage, but at a higher level if the switch is closed. Means are then provided to sense a surge and upon such sensing, to close the series switch to apply the voltage to thereby compensate for the voltage dip caused by a disturbance.

Since the voltage in the storage capacitor is always maintained at a constant level, the magnitude and duration of the load surge must be sensed and the "on" time of the higher voltage controlled. In order to accomplish this, the switch used in the series circuit will preferably be a semiconductor switch. More particularly, a d-c current control circuit or chopper circuit may be used. In this connection, it is adviseable to charge the quenching capacitor of the d-c current control circuit from the d-c input voltage of the inverter through a charging resistor. Means sensing the surge will then turn the control circuit on for a predetermined time, depending on the magnitude and duration of the load surge.

Any type of switch for use in the circuit of the present invention should have a saturable choke in the discharge current path of the storage capacitor for the purpose of limiting the current rise in the switch. If the d-c current control circuit is used, the choke can be included therein. Furthermore, a decoupling semiconductor such as a diode, can be connected in series with the circuit comprising the switch and the storage capacitor in series.

For the purpose of charging the storage capacitors, a separate auxiliary voltage source such as a battery can, of course, be provided. However, in some applications, it is simpler to use a rectifier fed by the a-c output voltage through a transformer.

As noted above, the duration of connecting the storage capacitor to the circuit input will depend on the magnitude and duration of the load surge. In operation, such control will be accomplished in such a manner that the duration of the "on" position of the switch depends on the magnitude of the a-c output current and the difference between the magnitude of the a-c output voltage and the d-c input voltage of the inverter arrangement. The time of switching the switch "on" can be obtained from the a-c output current alone.

DETAILED DESCRIPTION OF THE PREFERRED EMBODIMENT

Figure 1:
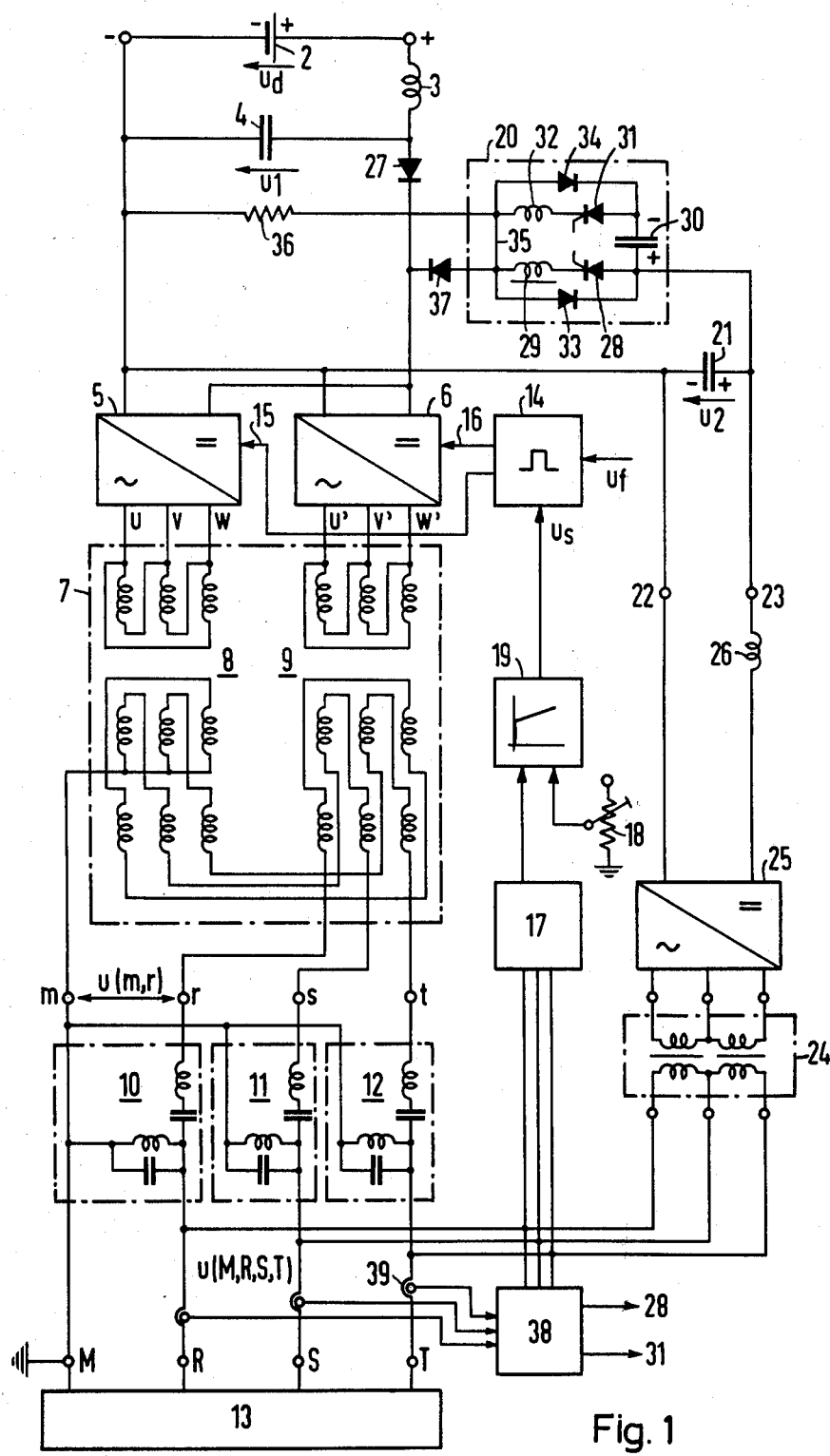
FIG. 1 is a schematic diagram of an inverter arrangement having the circuit of the present invention installed.

As shown on FIG. 1, a d-c voltage source 2 supplies an impressed voltage $u_d$ through a smoothing choke 3 to a pair of inverters 5 and 6. Across the input to the inverters 5 and 6 is a smoothing capacitor 4. Inverters such as this are often used, for example, in data processing systems. The source 2 may be a battery or may be a controlled rectifier with an adjustable or constant d-c output value. The d-c voltage present at the smoothing capacitor 4 is designated as $u_1$. This voltage is fed to the input side of the two inverters 5 and 6. The total inverter system includes the two inverters 5 and 6 along with the transformer 7. In addition, the system includes a voltage control circuit. The inverter arrangement is of a type well known in the art.

Each of the three-phase inverters 5 and 6 contains in well known manner, six controlled rectifiers (not shown) in a three-phase bridge circuit. With opposite polarity to each of the main rectifiers are connected reversed bypass diodes (also not shown.) The three output lines respectively $u$, $v$, $w$ and $u'$, $v'$, $w'$, of the inverters 5, 6 are inputs to the transformers circuit 7 which comprises, as shown, two transformers 8 and 9 of identical circuit design. In a transformer circuit 7, the output voltages of the two inverters are combined to form an overall output voltage.

The transformers 8 and 9 are known in the art as Dz6 circuits. Each primary is wound, together with two secondary windings, on a leg of the respective transformer 8 or 9. Two each of the secondary windings of adjacent legs are connected in series. The connection of the two transformers 8 and 9 on the secondary side is made in such a manner that the series connection of the two secondary windings of the one transformer 8 and the corresponding series connection of the other transformer 9, are connected in series. The one end of the series circuit formed thereby, which is always situated in the transformer 8 is connected to the output terminal $m$ and can be grounded at the latter. The other end of the series circuit leads to one of the output terminals $r$, $s$, or $t$, respectively. The overall output voltage formed in the transformer circuit 7 is then taken off at the output terminals $m$, $r$, $s$, and $t$.

In addition to the illustrated transformer circuit, other transformer circuits can also be used in which the secondary windings have a neutral point which can be opened and can therefor be connected in series. Transformer circuits whose secondary windings are delta-connected therefore cannot be used. Thus, two transformers of the type known as a Dz0 circuit may also be used for example.

The overall output voltage obtained from the transformer circuit 7 has a high harmonic content. To suppress these harmonics, bandpass filters 10, 11 and 12, respectively, which are tuned to the fundamental, for example, 50 Hz are connected between each of the output terminals $r$, $s$, and $t$ and the output terminal $m$. These bandpass filters 10, 11 and 12 are all of the same design containing a series resonant circuit followed by a parallel resonant circuit. The bandpass filters ensure that the higher harmonics and the combined overall output voltage are filtered out without appreciable phase shift of the fundamental.

The outputs of the bandpass filters supply a three-phase system having the phases R, S, and T and a neutral conductor M. This then feeds a three-phase load 13, which, for example, may be a data processing system or a plurality of a-c motors and will have an output voltage which has a harmonic distortion of less than 5 percent.

A common control unit 14 is used for firing all the main inverters in the inverter system. The control lines for the inverter 5 are designated as 15 and those for the inverter 6 as 16. The control forms a periodic analog synchronizing signal from which the control signals for main rectifier 5 as well as those of the inverter 6 are derived in dependence on an externally fed d-c control voltage $u_s$. In this control circuit, the control signals for the main rectifiers of the inverter 5 are advanced by a control angle $\alpha$ which can be adjusted by adjusting the d-c control voltage $u_s$ relative to the synchronizing signal. The control signal for the main rectifiers of the inverter 6 are retarded by the same control angle $\alpha$. Thus, a time interval $2\alpha/w$ lies between the firing time of two corresponding main rectifiers of the two inverters 5 and 6 where $w$ is the common angular frequency of the output voltages of the two inverters. The frequency $f = w/2\pi$ of both inverters 5 and 6 can be set to a fixed value at the control unit 14 by means of an externally fed frequency control voltage $u_f$ or can be controlled as a function of other quantities.

The control angle $\alpha$ can be varied by the d-c control voltage $u_s$ and the magnitude of the a-c output voltages can be set thereby. The control angle $\alpha$ is in general proportional to the d-c voltage $u_s$. The d-c control voltage $u_s$ can be controlled as a function of other quantities or can be formed in a control loop circuit. In the embodiment illustrated on FIG. 1, a voltage control circuit is shown which can be used to keep the a-c output voltage constant at the input of a three-phase load 13. In this manner, the a-c output voltage becomes independent of fluctuations of the d-c voltage $u_d$. In the voltage control circuit, the rectified actual value of the a-c output voltage between the phases R, S, and T, is first determined by means of a voltage transformer 17. This actual value is compared with a preset voltage reference value, which is obtained from a reference value transmitter 18 which, as shown, may be a potentiometer, at the input of a voltage regulator 19. In typical fashion, the voltage regulator 19 will comprise an integrator or the like and will provide an output, which changes in dependence on the deviation between the predetermined voltage and the measured voltage. This output is then fed as the value $u_s$ to the control unit 14. Thus, the control 14 is controlled as a function of the a-c output voltage. When actual value of a-c output voltage occurs which deviates from the set voltage the preset voltage reference, the control angle $\alpha$ is adjusted until the output voltage again equals the preset voltage value.

What has been described up to now is the same as that found in prior art systems. It has been found, however, that the voltage control circuit just described does not operate fast enough to overcome the effects of the bandpass filters 10, 11 and 12 to maintain a constant a-c out put voltage under all operating conditions. If load surges occur in three-phase load 13, the bandpass filters 10, 11 and 12 acquire a transient reactance as a function of the magnitude of the load surges. In other words, in the event of a load surge, the bandpass filter 10, for example, acts temporarily as a considerable inductive reactance with respect to the fundamentals for the phase R. The a-c output voltage between the conductor R and the neutral M is thus reduced for a certain period of time. In similar fashion, an inductive impedance also appear for a brief period of time in the phases S and T and thereby leads to a voltage reduction at the three-phase load 13. After some time, the dip in the a-c output voltage disappears but, in some three-phase loads, for example, in data processing systems even a short dip can lead to malfunctions in operations.

In order to avoid such voltage dips occuring due to low surges, the present invention provides a switch 20 and a storage capacitor 21 in series with each other across the d-c voltage input to the inverters 5 and 6. The storage capacitor 21 is charged to a constant voltage $u_2$ through the use of any type of auxiliary d-c voltage source connected to its terminal 22 and 23. The polarity of the voltage $u_2$ at the storage capacitor 21 is selected so that, after the switch 20 is closed, the voltage $u_2$ appearing at the input of the inverters 5 and 6 will be of the same polarity as the d-c input voltage $u_1$. The voltage $u_2$, is however, higher than that of the d-c input voltage $u_1$. The voltage difference $u_2 - u_1$ is obtained from the following equation:

$$\Delta u = 1 . \Delta t / C$$

where $I$ is the desired discharge current which must flow through the switch 20, and $\Delta t$ the desired discharge time and $C$ the capacity of the storage capacitor 21. For example, with a desired discharge current of $I = 200$ A, a capacity $C = 50$ mF and a desired discharge time $\Delta t = 10$ ms, a voltage difference $\Delta u$ of 40 V is required.

As illustrated, the need for separate auxiliary d-c voltage source can be avoided by using the output a-c voltage to obtain the necessary d-c input voltage to the capacitor. Thus, as shown, a three-phase transformer 24 obtains inputs from the a-c voltage. The output of the transformer which will step up this voltage to the desired level is provided to a conventional uncontrolled rectifier 25 which then supplies its output to the terminals 22 and 23. As shown, a smoothing inductance 26 is included in one of the output lines.

In order to prevent the d-c source 2 from being affected by the storage capacitor 21 during the discharge process, a back biased diode 27 is provided in the input line. This is the diode will conduct current only from the voltage source 2, to the inverters and will not permit current to flow from the capacitor back to the source 2. Alternatively, a diode may also be placed in the proper direction in the negative line.

The switch 20 in the preferred embodiment illustrated will comprise an extinguishable semiconductor switching device which in the present case comprises a d-c current control circuit or chopper circuit having a controlled rectifier 28. Various d-c current control circuits are known in the art. A preferred design is that described in German Pat. No. 1,242,289.

As shown on FIG. 1, a saturable choke 29 is connected in the discharge path of the storage capacitor 21. That is, it is in series with the main controlled rectifier 28. This is necessary in order to limit the rate of rise of the discharge current after the rectifier 28 is fired to thereby protect the rectifier 28. This saturable choke 29 may also be placed in any other point in the discharge current path. In the present example, however, the saturable choke 29 is normally included as part of the d-c current control circuit. Parallel to the series circuit comprising the main rectifier 28 and the saturable choke 29 is connected a series circuit comprising a quenching capacitor 30 and a controlled quenching rectifier 31 and quenching choke 32 along with an uncontrolled rectifier 33. Rectifier 33 has a polarity opposite of the main controlled rectifier 28. The series circuit comprising the quenching rectifier 31 and the quenching choke 32 is bridged by an uncontrolled charge reversal rectifier 32 which has a polarity opposite to that of the quenching rectifier 31.

A charging resistor 36 is connected between the negative connecting line from the d-c voltage source and the inverter arrangement in the junction 35 of the series circuit made up of choke 32, rectifier 31 and capacitor 30, which is in series with the choke 29 and the rectifier 28. When the quenching rectifier 31 is fired, the quenching capacitor 30 is charged through this charging resistor 36 to the polarity shown and to a voltage $u_2$ of the storage capacitor 21. When the main rectifier 28 is fired, the charge of the quenching capacitor 30 is reversed in well known manner and by firing of the quenching rectifier 31, the main rectifier 28 can again be extinguished. It is particularly advantageous to couple an uncontrolled decoupling rectifier 37 between the positive line and the junction 35. This rectifier must have a polarity in the direction of the main rectifier 28. The decoupling rectifier prevents current from flowing continuously through the charging resistor 36 due to the d-c input voltage $u_1$.

Figure 2:
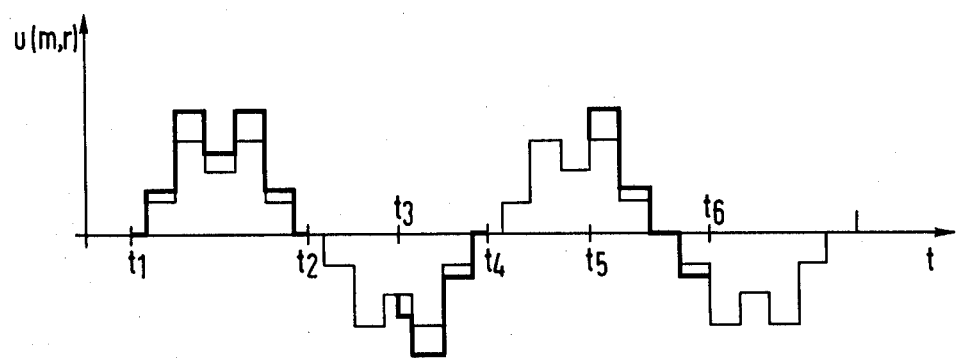
FIG. 2 is a wave-form diagram showing the a-c voltage at the input of a band pass filter such as that in FIG. 1.
Figure 3:
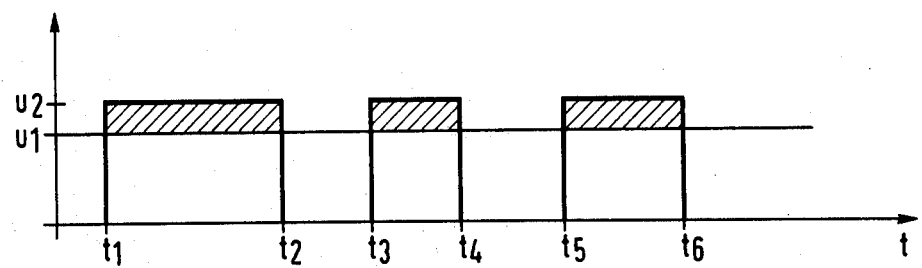
FIG. 3 is a wave-form diagram illustrating the shape of the d-c voltage at the d-c voltage input of the inverter arrangement of FIG. 1.

Upon occurence of a load surge at the load 13, the switch 20 is closed by an ignition unit 38, to be described below, so that the voltage $u_2$ of the storage capacitor 21 is applied to the d-c input of the inverter arrangement. The overall output voltage at the output of transformer circuit 7 and thus, also the output voltage at the output of bandpass filters 10, 11 and 12, is raised thereby without any appreciable delay. Thus, the voltage dip which would otherwise occur due to the transient reaction is compensated for. FIGS. 2 and 3 illustrate the wave forms associated with this action.

FIG. 2 shows in thin lines the voltage prior to the band pass filter 10 as a function of time $t$. This voltage which is indicated as being $u(m, r)$ i.e., the voltage between the outputs $m$ and $r$ occurs due to a superposition of the partial windings of the transformer circuit 7 and is rich in harmonics. The thin line curve is obtained if the lower d-c input voltage $u_1$ is applied to the inverter arrangement. The heavy line waveform indicates the higher voltage which will occur if at the firing times $t_1$, $t_3$ and $t_5$, as shown on FIG. 3 the main rectifier is fired and the voltage $u_2$ of the storage capacitor applied across the input of the inverter arrangement. As shown, this voltage is again removed at the quenching time $t_2$, $t_4$ and $t_6$ respectively by the firing of the quenching rectifier 31.

As shown on FIGS. 1 and 2, the "on" duration $(t_2 - t_1)$, $(t_4 - t_3)$ and $(t_6 - t_5)$, respectively, of the switch 20 is variable. It is adjusted as a function of the load surge. The firing points $t_1$, $t_3$ and $t_5$ of the main value are preferably derived from the load current by means of the firing unit 38. In order to ascertain the load current, current transformers 39 are provided, which are connected to the ignition unit 38. The control electrode of the main rectifier 28 is connected to the firing unit through an ignition line designated 28. In the ignition unit 38, a change in the quasi-stationary state of the load current as well as that of the load voltage can be determined and converted into a corresponding "on" duration of the switch 20. i.e., for firing the quenching rectifier 31, the control electrode of the latter is connected to the ignition unit via the line designated 31. The "on" duration will depend upon the change of the load current during the load surge, in the sense that an increase of load current leads to a lengthing of the "on" duration. In particular, it is determined by the difference between the magnitude of the a-c output voltage and the d-c input voltage $u_1$ of the inverter arrangement.

Figure 4:
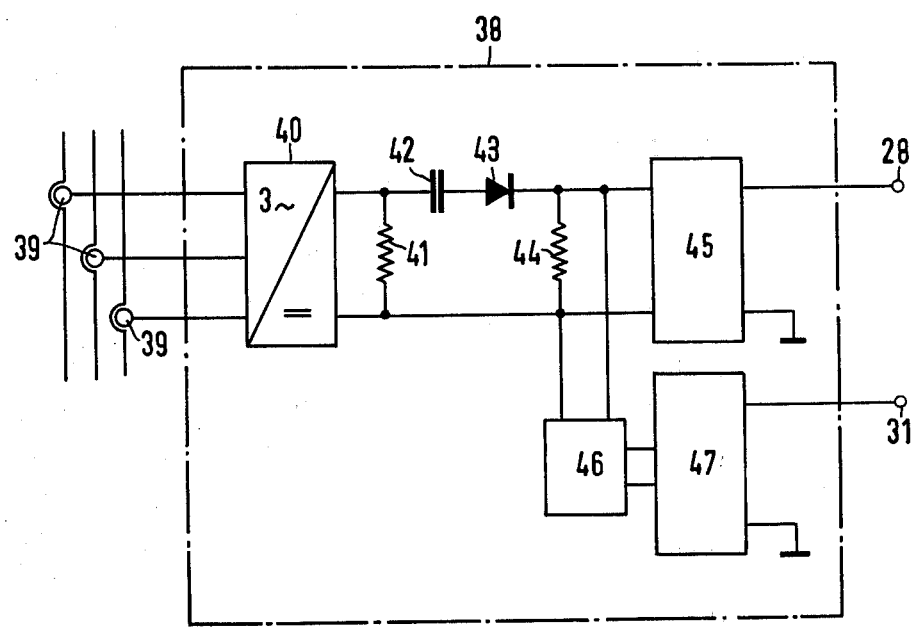
FIG. 4 is a schematic diagram of the circuit used in FIG. 1 for sensing the occurence of load surges.

The operation in the ignition unit 38 may be seen in more detail from an examination of FIG. 4. As shown thereon, the outputs of the current transformers are provided to a conventional three-phase rectifier 40 which may, in typical fashion, be in a three-phase bridge arrangement. The d-c output therefrom is provided across a resistor 41 which serves to convert the sensed current into a voltage proportional thereto. This proportional voltage across the resistor 41 is provided through a capacitor 42 and a diode 43 to a resistor 44. The capacitor 42 acts as a differentiator and the diode 43 acts to permit only positive pulses to be passed. When a load surge occurs, the current sensed by the current transformers 39 will increase and along with it the voltage across the resistor 41. This voltage increase will be differentiated by the capacitor 42 and since it is in a positive direction, will appear across the resistor 44. The voltage at resistor 44 is provided to the input of a monostable or one shot multi-vibrator 45. Thus, the positive portion of the pulse output of the differentiating capacitor 42 will fire this one shot to provide an output pulse to the controlled rectifier 28 as indicated by the numer 28 at its output. The voltage across the resistor 44 is also provided to a reversing stage 46. The stage output is provided to a second one shot multi-vibrator 47. One shots 45 and 47 trigger only on positive going pulses. Thus, when the pulse out of the differentiator 42 returns to zero, this falling edge through the reversing stage 46 will trigger the one shot 47 to provide an output pulse to the quenching rectifier 31 as indicated by the labelling of the output line. Note, that as long as the current surge is occuring, i.e., as long as the current is increasing, the output from the differentiator will be in the positive direction and only as the surge is taken care of both by the system of the present invention in conjunction with the normal control circuit described above, will the second one shot 47 be fired. Thus, in terms of the parameters listed above, the system at this time be reaching a point where the relationship between the input voltage and output voltage is proper. Note also, that through the use of the diode 43 only the positive portion of the surge is allowed to act on the system and thus, the higher voltage cannot accidentally be switched in as the system is being restored to normal.

Thus, an improved circuit for use with an inverter arrangement has been shown. Although a specific embodiment has been illustrated and described, it will be obvious to those skilled in the art that various modifications may be made without departing from the spirit of the invention which is intended to be limited solely by the appended claims.

What is claimed is:

1. A circuit for use with an inverter arrangement of the type which feeds a load through at least one filter providing to said load a constant ac output voltage, said circuit comprising:
   a. a series circuit comprising a switch and a storage capacitor shunted across the d-c input of the arrangement;
   b. means to charge the storage capacitor to a d-c voltage which is higher than the normal d-c input voltage of the arrangement but which which will be at the same polarity as said normal input voltage when said switch is closed
   c. means for closing said switch responsive to a voltage dip at the output of said filter, said voltage dip being of short duration and being caused by a transient reactance which becomes effective in said filter when a load surge occurs at the output of said filter, and
   d. means for opening said switch responsive to the magnitude of the a-c output current of said filter, thereby compensating for said voltage dip at the output of said filter during the "on" duration of said switch.

2. The circuit according to claim 1 wherein an extinguishable semiconductor rectifier means is provided as the switch.

3. The invention according to claim 1 wherein said switch comprises a d-c current control circuit.

4. The invention according to claim 3 wherein said d-c control circuit includes a quenching capacitor and further including a charging resistor coupling said quenching capacitor to said capacitor.

5. The invention according to claim 3 wherein said d-c current control circuit includes a saturable choke in the discharge current path of said storage capacitor for limiting the rate of current rise in said switch.

6. The invention according to claim 2 and further including a saturable choke in the discharge path of said storage capacitor for limiting the rate of current rise in said switch.

7. The invention according to claim 5 and further including a decoupling rectifier in series with the series circuit comprising said switch and said storage capacitor.

8. The invention according to claim 1 wherein said means for charging said storage capacitor comprise a step-up transformer coupled to the a-c output voltage of said inverter arrangement and a rectifier coupled to the output of said transformer.

9. The invention according to claim 1 wherein said means for closing said switch comprise means responsive to the magnitude of the increase of the a-c output current of said filter.

10. The invention according to claim 1 wherein the "on" duration of said switch is a function of the increase of the magnitude of the a-c output current of said filter, in the sense that an increase of the a-c output current leads to a lengthening of the "on duration.

11. The invention according to claim 1 wherein the time of closing said switch is derived from the a-c output current of said filter.

12. The invention according to claim 1 wherein said inverter arrangement includes two controlled inverters having output voltages respectively advanced and retarded in time with respect to a synchronization signal, the degree of advancement and retardation being the same absolute value for each, with the output voltages of said inverters being superimposed in a transformer circuit to form an overall output voltage which is fed to a load through filters.

* * * * *